United States Patent [19]

Beck et al.

[11] Patent Number: 4,482,191
[45] Date of Patent: Nov. 13, 1984

[54] DUAL CIRCUIT BRAKE VALVE

[75] Inventors: Siegfried Beck; Jürgen Holfelder, both of Stuttgart; Steffen Straub, Vaihingen; Aloys Schnäker, Ditzingen, all of Fed. Rep. of Germany

[73] Assignee: Robert Bosch GmbH, Stuttgart, Fed. Rep. of Germany

[21] Appl. No.: 392,487

[22] Filed: Jun. 28, 1982

[30] Foreign Application Priority Data

Aug. 4, 1981 [DE] Fed. Rep. of Germany ....... 3130759
Mar. 3, 1982 [DE] Fed. Rep. of Germany ....... 3207618

[51] Int. Cl.³ ............................................ B60T 15/06
[52] U.S. Cl. .................................................... 303/52
[58] Field of Search ....................... 303/50, 52, 53, 54, 303/40

[56] References Cited

U.S. PATENT DOCUMENTS

| | | | |
|---|---|---|---|
| 3,207,561 | 9/1965 | Bueler | 303/52 |
| 3,219,396 | 11/1965 | Bueler | 303/52 |
| 3,266,850 | 8/1966 | Herold | 303/52 |
| 3,390,920 | 7/1968 | Dobrikin | 303/52 |
| 3,507,545 | 4/1970 | Page et al. | 303/54 X |

FOREIGN PATENT DOCUMENTS

| | | | |
|---|---|---|---|
| 1052837 | 3/1959 | Fed. Rep. of Germany | 303/52 |
| 856638 | 12/1960 | United Kingdom | 303/52 |

Primary Examiner—Duane A. Reger
Attorney, Agent, or Firm—Edwin E. Greigg

[57] ABSTRACT

A dual circuit brake valve which is provided with a relief connection intended for two separate individual valves and in which two outlet valve seats are disposed centrally in the valve. The two outlet valve seats are prestressed with respect to one another by way of a bolt and a prestressed pressure-limiting spring in such a way that at a time braking begins the two individual valves represent a rigid connection. From a pressure limitation point on, the two individual valves then support themselves elastically against one another, so that a further increase in braking pressure is precluded. The dual circuit brake valve is intended for brake systems having high pressure as a reservoir pressure and normal pressure as the braking pressure.

5 Claims, 1 Drawing Figure

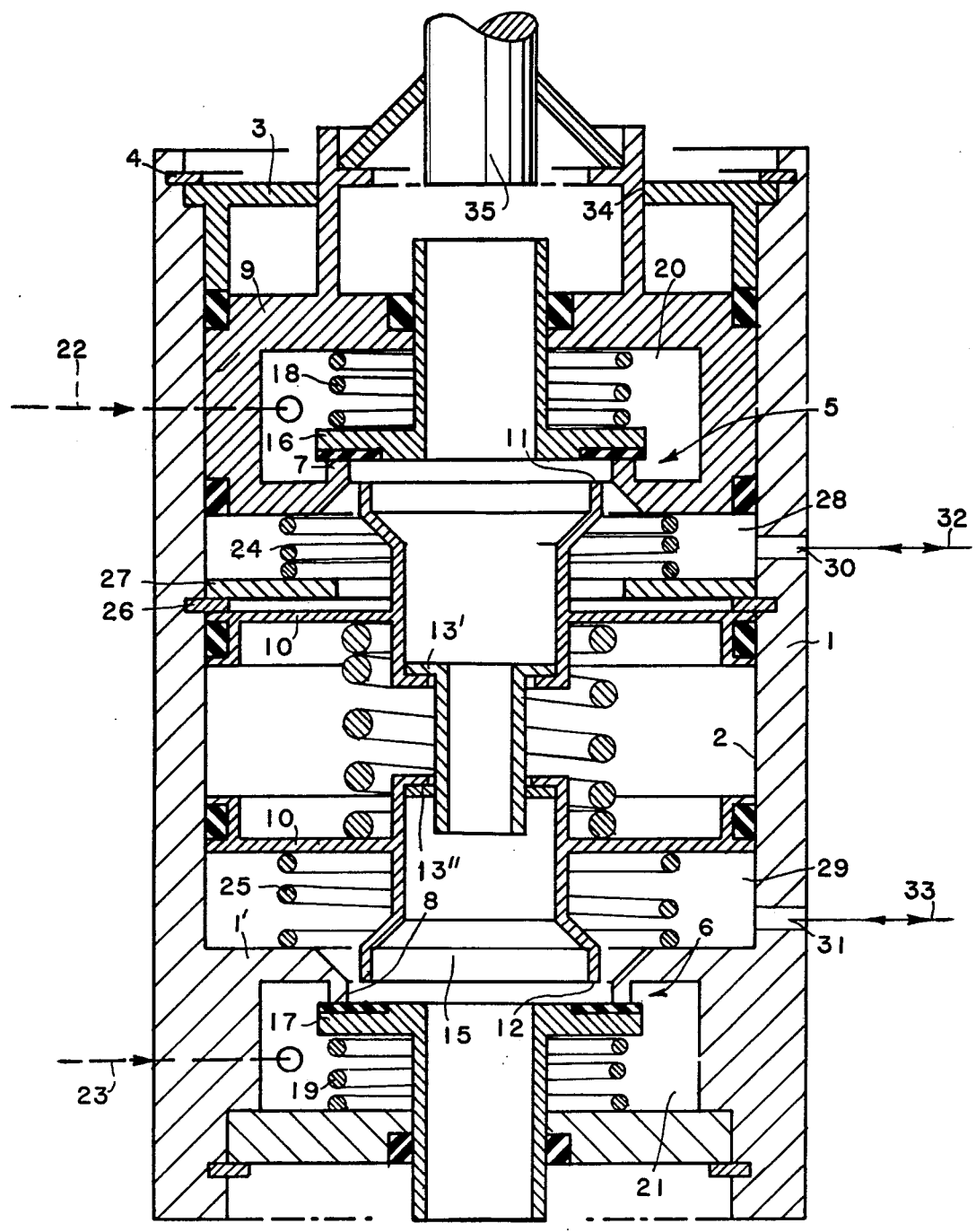

4,482,191

DUAL CIRCUIT BRAKE VALVE

BACKGROUND OF THE INVENTION

The invention is based on a dual circuit brake valve as generally described. A brake valve of this type is known (German examined application DE-AS No. 27 16 495).

With this known valve, there is the problem that the requirement for compressed air in brake systems and secondary consumers, which continues to increase, makes it more and more difficult to accommodate the volume of containers which thus increases necessarily as well. It is possible to raise the level of compressed air so as to avoid having containers of larger size; however, in order to limit the operating pressure in the brake system with respect to the high pressure in the air generating system to the necessary pressure level, it is simultaneously useful to create opportunities for limiting pressure which are advantageously combined with the brake valve.

In order to solve this problem, the known design inserts a spring element between the actuation member and the control and repercussion piston. The second individual valve is then actuated in accordance with the pressure directed into the first brake circuit. This is disadvantageous, however, in terms of a requirement for synchronized operation.

OBJECT AND SUMMARY OF THE INVENTION

The dual circuit brake valve has the advantage over the prior art that the pressure limitation can be performed uniformly and simultaneously in both brake circuits. It is furthermore advantageous that the pressure limitation is maintained even if one brake circuit fails. Finally, it is also advantageous that a conventional dual circuit brake valve can be retrofitted at minimal expense merely by measuring specific distances and by inserting a spring, to produce a valve with a pressure limitation function. Despite short response paths, sufficiently large cross sections are made available for relieving the brake cylinder when the brake is released. The ventilation strokes are identical for both individual valves and are executed simultaneously.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing illustrates an exemplary embodiment of the invention, which is described in detail below.

DESCRIPTION OF THE PREFERRED EMBODIMENT

A dual circuit control valve has a cylindrical housing 1 with a through bore 2 stepped at several points to form shoulders for receiving a cap 3 which is inserted into the housing 1 at the top, the cap being fixed in place by a snap ring 4 and a bottom cap is held in place by a snap rim. An inwardly extending radial arm 1' provides an inlet valve seat 8.

Two individual valves 5 and 6 are accommodated one below the other in the housing 1, being embodied as double seat valves. Valve 5 includes a valve body and a closing body 16. The valve body is surrounded by a force spring 18 and seats against an inlet valve seat 7 of the first individual valve 5 formed on an inward radial arm of a control and repercussion piston 9 upon which the valve seat is formed. The valve body of valve 5 extends coaxially through piston 9 and is movable relative thereto. An O-ring seal is provided to prevent leakage of fluid between the valve body of valve 5 and the piston 9.

Valve 6 includes inlet valve seat 8 which is located on the inwardly extending radial wall of the housing 1. Valve 6 includes a body portion that extends through the bottom end cap and a closing body 17 which is forced against the inlet valve seat 8 by a spring 19 that surrounds the valve body. The area confined by the piston 9 and the closing body 16 forms a fluid supply chamber 20 which is provided with a fluid inlet line 22. The inwardly radially extending arm 1' of the body and the closing body 17 of valve 6 forms a fluid supply chamber 21 having an inlet line 23.

The body 1 is provided with a groove somewhat centrally located in the bore 2 in which is placed a snap ring which operates as a stop or support 26. A ring 27 in the bore 2 above the stop 26 provides a support for one end of a spring 24 which is forced against the lower side of piston 9. Below stop 26 are found a pair of pistons 10 each of which is provided with oppositely directed outlet valve seats 11 and 12.

The outlet valve seats 11 and 12 are spread apart by means of a pressure-limiting spring 14 disposed concentrically with respect to them and embodied as a hollow cylinder. The bolt 13 is provided with two flange-type stops 13' and 13'', which assure that the pressure-limiting spring 14 is fastened in place and prestressed. Flange 13' is fitted in the bottom of the valve including valve seat 11. The bolt 13 extends into one end of the valve including valve seat 12 and is provided with flange 13'' which is located within piston 10 that includes valve seat 12. The bolt 13 is movable within valves 5 and 6. The arrangement is such that the spacing between the two outlet valve seats 11 and 12 may be smaller than the spacing between the two inlet valve seats 7 and 8. The pressure-limiting spring 14 is disposed between upper and lower pistons 10 in a common relief chamber open to the atmosphere relative to a common relief outlet 15 of the two individual valves 5 and 6, which outlet is carried downward and out of the housing 1. The bolt 13, the pressure-limiting spring 14, and the outlet valve seats 11 and 12 are located in a second piston 10 of the control valve. The internal free space inside the pressure-limiting spring 14 forms a passageway to the ambient air, which is effective for both brake circuits. A valve closing body 16 of the first individual valve 5 is disposed in the first piston 9, and is pressed against the inlet valve seat 7 by a valve spring 18. A valve closing body 17 of the second inlet valve 6 is located in the housing bottom 1' and is pressed by a valve spring 19 against the inlet valve seat 8. Each closing body 16 and 17 is disposed in a supply chamber 20 and 21 respectively, which are connected each to one supply line 22 and 23 via a conduit connection which is indicated only schematically. Each piston 9 and 10 is subjected to the force of a spring 24 and 25, which have the tendency to press the pistons upward. The piston 9 usually rests against the cap 3 and the piston 10 rests against one side of a snap ring 26, which on its other side fixes the position of a support disk 27 for the spring 24 in the housing 1. The two springs 24 and 25 are disposed in pressure-changing chambers 28 and 29, which are connected via housing connections 30 and 31 to two consumer lines 32 and 33.

The cap 3 has a central aperture 34, through which an upper cylindrical end portion of piston 9 extends to receive an actuation member 35 that protrudes into the cylindrical end portion of piston 9. This member 35 is connected at one end with piston 9 and at the other end can be actuated from the outside, being engaged by a brake pedal, not shown.

MODE OF OPERATION

If the dual circuit brake valve is actuated, then first the piston 9 travels downward until the closing body 16 of the first individual valve 5 reaches the outlet valve seat 11. The outlet valve 11, 16 of the first individual valve 5 is thus closed. Upon further actuation, the outlet valve seats 11 and 12, which are coupled under the influence of prestressing, are displaced in common downward by spring 14 until the outlet valve 12, 17 of the second individual valve 6 has also closed. The prestressing of the pressure-limiting spring 14 assures that at first the spacing between the two valve seats 11 and 12 will remain the same.

Once the valves 5 and 6 are seated upon valve seats 11 and 12, further movement of the actuation member 35 and the piston 9 will open the two inlet valves 7, 16 and 8, 17, and supply air from the supply chambers 20 and 21 reaches the pressure-changing chambers 28 and 29 and from there reaches the two consumer lines 32 and 33.

Upon attaining the limitation pressure, the pressure-limiting spring 14 then yields, and the distance between the two outlet valve seats 11 and 12 is shortened because the pistons 10 are moved closer together due to the yielding of spring 14. During this movement, the bolt 13 moves within the valves. The brake pressure directed into the system then increases only by a small amount, in accordance with the spring constants of the pressure limiting spring 14. It is true that the actuation member 35 also traverses an actuation path thereafter, but no further increase in pressure takes place because the spacing between the pistons 10 become less while the spacing between the pistons and the valve seats 7 and 8 remain the same. The brake pressure directed into the system is thus limited in this manner. After the actuation member 35 has been relaxed and allowed to return to its normal position, the inlet valve seats 7 and 8 close and the outlet valve seats 11 and 12 open. Since the outlet valve seats 11 and 12 open the pressure outlet lines will be relieved because the fluid in chambers 28 and 29 passes through the pistons 10, the bolt 13 and the relief outlet 15 to the outside of housing 1.

If there is a failure of the brake circuit, the inlet stroke of the individual valve of the defective circuit will be executed until the corresponding piston 9 or 10 rests on its stop. Since the brake circuit which is still intact still exerts force upon the pressure limiting spring 14, the limitation pressure for the intact brake circuit remains unchanged.

In the drawing, only one pressure limiting spring 14 is shown. If this spring were to break, then the braking action would fail competely. It is therefore important for the pressure limiting spring 14 to be designed in an appropriately safe manner. However, it is also easily possible to incorporate two springs instead of one spring 14. If one of these two springs were to break, the result would be half the limitation pressure, and this would be entirely sufficient for auxiliary braking.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A dual circuit brake valve for a brake system of a motor vehicle comprising a housing, said brake valve having two individual valves disposed one after the other in said valve housing, each of said individual valves including an inlet valve seat and a piston including an outlet valve seat, a control and repercussion piston for operating said individual valves, further including an actuation member for mechanical actuation of at least one of said two individual valves, characterized in that a pressure-limiting spring is inserted between said pistons of said two individual valves for the purpose of pressure limitation between said two valves.

2. A dual circuit brake valve as defined by claim 1, characterized in that a distance between said outlet valve seats of the two individual valves can become smaller than a distance between said inlet valve seats of the individual valves.

3. A dual circuit brake valve as defined by claim 1, characterized in that said pressure-limiting spring is disposed in a common relief outlet of the two individual valves.

4. A dual circuit brake valve as defined by claim 1, 2, or 3, characterized in that the pressure-limiting spring is embodied in a hollow cylindrical form and that its internal free space represents a passageway to the ambient air which is intended for both brake circuits.

5. A dual circuit brake valve as defined by claim 1, 2, or 3, characterized in that the pressure-limiting spring is fastened in place and prestressed.

* * * * *